(12) United States Patent
Jackson

(10) Patent No.: US 7,152,790 B2
(45) Date of Patent: Dec. 26, 2006

(54) METHOD OF CONDUCTING AIRLINE SECURITY

(75) Inventor: Diane Jackson, Beverly Hills, MI (US)

(73) Assignee: Imagine Pass L.L.C., Beverly Hills, MI (US)

(*) Notice: Subject to any disclaimer, the term of this patent is extended or adjusted under 35 U.S.C. 154(b) by 386 days.

(21) Appl. No.: 10/437,758

(22) Filed: May 14, 2003

(65) Prior Publication Data

US 2003/0213842 A1 Nov. 20, 2003

Related U.S. Application Data

(60) Provisional application No. 60/380,757, filed on May 14, 2002.

(51) Int. Cl.
*G07B 15/02* (2006.01)

(52) U.S. Cl. .................. 235/384; 235/487

(58) Field of Classification Search ............ 235/383, 235/375, 385, 462.01, 487, 494
See application file for complete search history.

(56) References Cited

U.S. PATENT DOCUMENTS

| | | | |
|---|---|---|---|
| 4,195,431 A | 4/1980 | Neufeld | |
| 4,557,215 A | 12/1985 | Petersson | |
| 4,906,025 A * | 3/1990 | Schreindl | 281/45 |
| 5,386,933 A | 2/1995 | Greene et al. | |
| 5,400,936 A | 3/1995 | Jones et al. | |
| 5,785,354 A * | 7/1998 | Haas | 283/74 |
| 5,797,126 A * | 8/1998 | Helbling et al. | 705/5 |
| 5,914,197 A * | 6/1999 | Goudjil | 428/537.5 |
| 5,956,877 A | 9/1999 | Raasch et al. | |
| 5,979,941 A | 11/1999 | Mosher, Jr. et al. | |
| 6,142,368 A | 11/2000 | Mullins et al. | |
| 6,211,790 B1 | 4/2001 | Radomsky et al. | |
| 6,349,493 B1 | 2/2002 | Newman et al. | |
| 6,464,136 B1 | 10/2002 | Walsh | |
| 6,580,356 B1 * | 6/2003 | Alt et al. | 340/5.8 |
| 6,945,464 B1 * | 9/2005 | Jackson | 235/487 |
| 2001/0048027 A1 | 12/2001 | Walsh | |

* cited by examiner

Primary Examiner—Daniel Stcyr
(74) Attorney, Agent, or Firm—Dickinson Wright PLLC

(57) ABSTRACT

A method of processing an airline passenger through a terminal comprising the steps of verifying the identity of the passenger by checking a physical characteristic unique to the passenger and taking a picture of the identified passenger. A wristband-ticket (10) is issued having first (12) and second (14) ends and including an attachment (16, 20, 22) associated with the ends for securely attaching the ends together and rendering the ends non-retachable in response to being detached. The ticket is issued with a picture (28) of the identified passenger thereon as well as the terminal gate and the flight number and seat assignment thereon. In addition, the ticket is issued with a bar code (24) thereon identifying the passenger and flight information. The wristband-ticket (10) is placed around the wrist of the identified passenger and the passenger passes through checkpoints by reading the bar code and/or viewing the photograph.

5 Claims, 2 Drawing Sheets

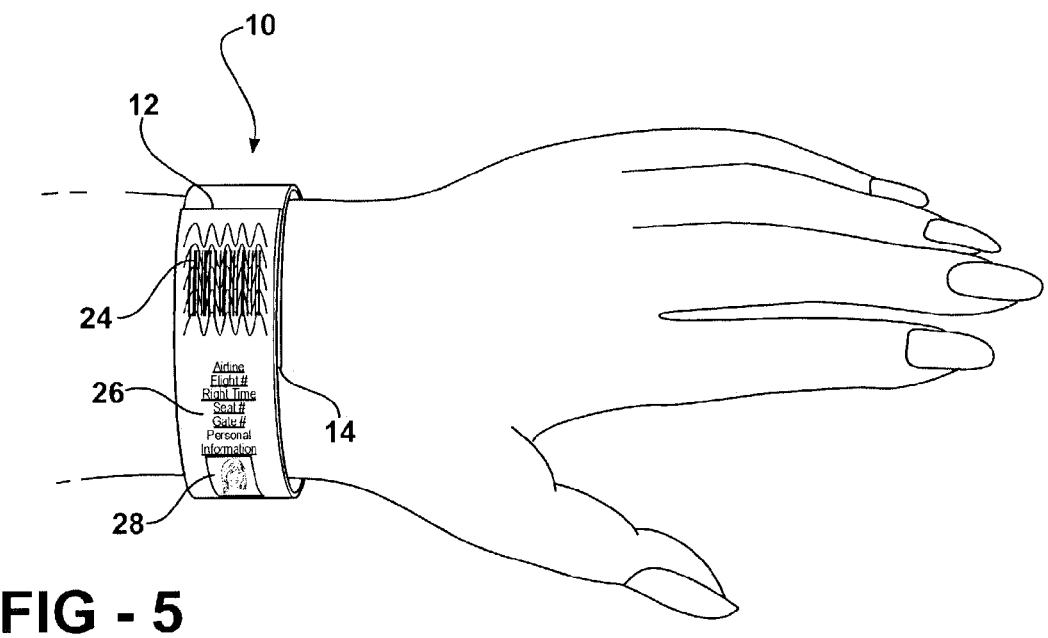
FIG - 5
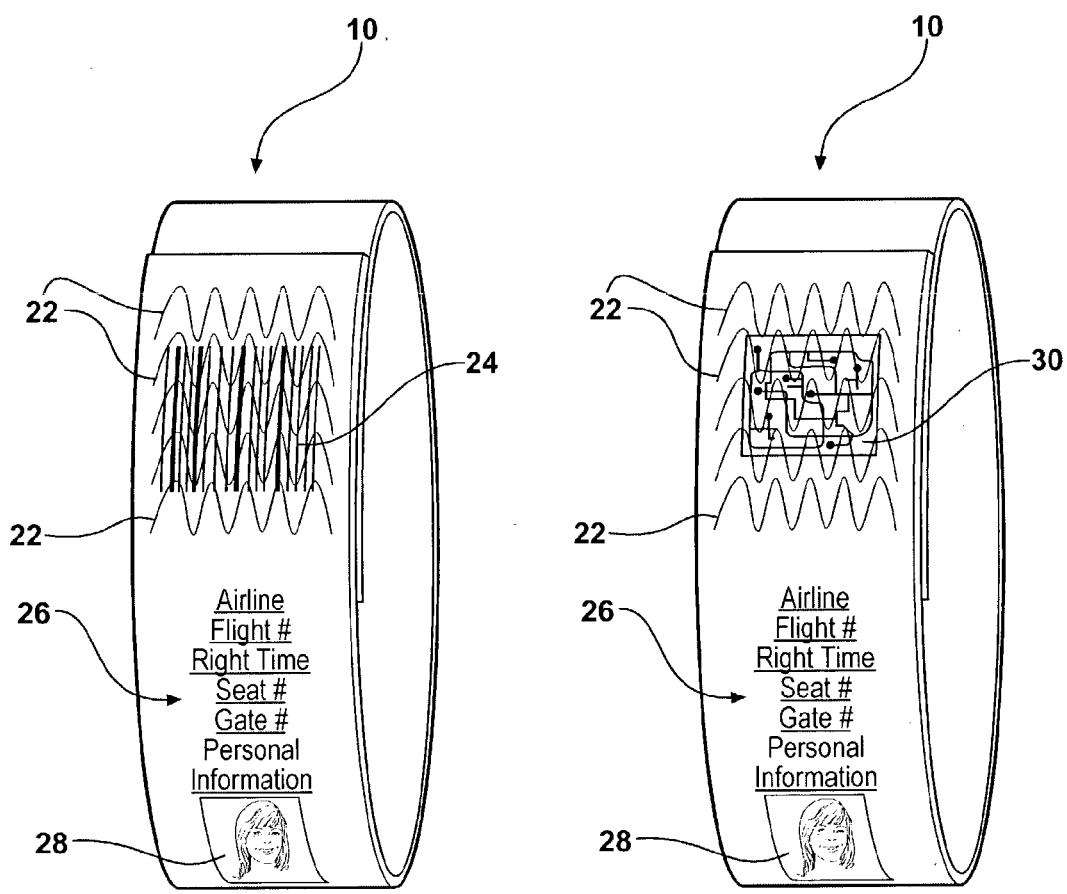
FIG - 6    FIG - 7

METHOD OF CONDUCTING AIRLINE SECURITY

RELATED APPLICATIONS

This application claims the benefit of provisional application No. 60/380,757 filed May 14, 2002.

BACKGROUND OF THE INVENTION

1. Field of the Invention

The subject invention provides an improved method of processing an airline passenger through a terminal.

2. Description of the Prior Art

A typical progression of an airline passenger is to acquire flight reservation before going to the terminal to check-in for a flight. An agent or an eticket machine issues an eticket or boarding pass. In some instances, the passenger may print a boarding pass at an internet terminal before proceeding to the terminal. In whatever fashion the passenger receives the boarding pass, the passenger must show both the boarding pass and a picture identification at one or more check points in the terminal. A security agent checks the name on the boarding pass against the name and picture on the picture ID.

There remains a need to simplify and render more secure the processing of an airline passenger through a secure airline terminal.

SUMMARY OF THE INVENTION AND ADVANTAGES

The subject invention provides a method of processing an airline passenger through a terminal comprising the steps of verifying the identity of the passenger, issuing a wristband-ticket having first and second ends and including an attachment associated with said ends for securely attaching said ends together and rendering the ends non-retachable in response to being detached, issuing the wristband-ticket with a code thereon identifying the passenger and flight information, placing a wrist band around the wrist of the identified passenger, and passing the passenger through check points by reading the code.

Accordingly, the invention provides a positive identification and the attachment of the ticket directly to that identified passenger without possibility of re-use while allowing automatic reading of the passenger's ticket at various checkpoints, thereby eliminating the labor of security agents, i.e., cost reduction.

BRIEF DESCRIPTION OF THE DRAWINGS

Other advantages of the present invention will be readily appreciated as the same becomes better understood by reference to the following detailed description when considered in connection with the accompanying drawings wherein:

FIG. 5 is a perspective view showing the airline wristband-ticket on the wrist of a passenger;

FIG. 6 is an exploded perspective view of the airline wristband-ticket; and

FIG. 7 is an exploded view like FIG. 6 but showing an electrical circuit in place of a bar code.

DETAILED DESCRIPTION OF THE PREFERRED EMBODIMENT

Figure 1:
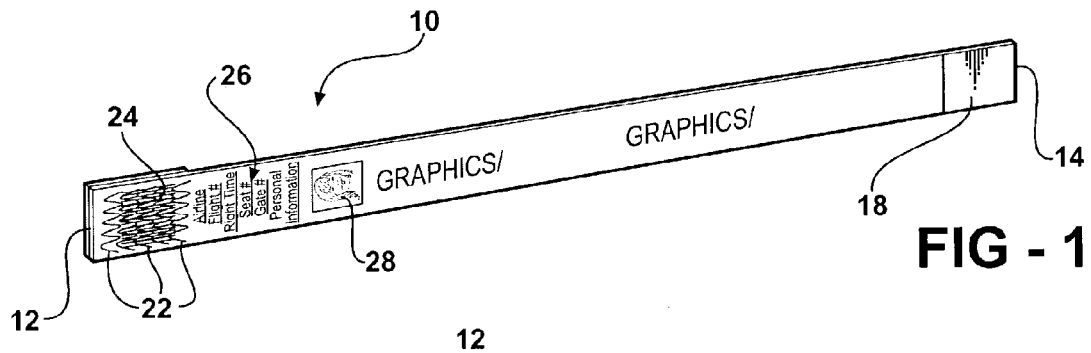
FIG. 1 is a perspective view of the airline wristband-ticket used in the subject invention.
Figure 2:
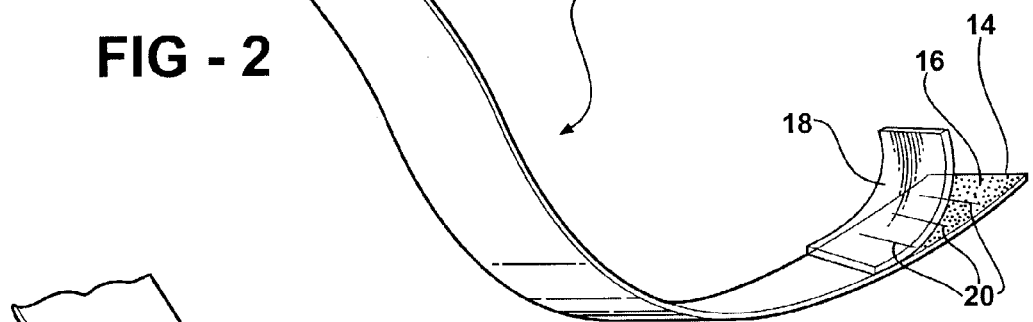
FIG. 2 is perspective view of the airline wristband-ticket while removing the cover sheet thereby exposing the adhesive.
Figure 3:
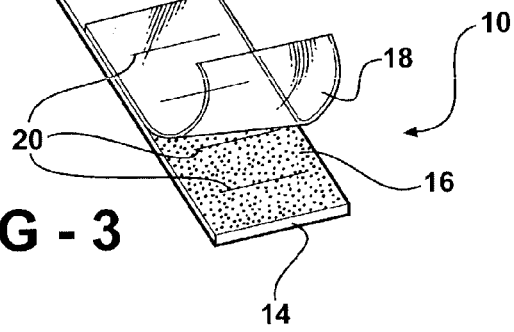
FIG. 3 is perspective view also showing the removal of the cover sheet to expose the adhesive.
Figure 4:
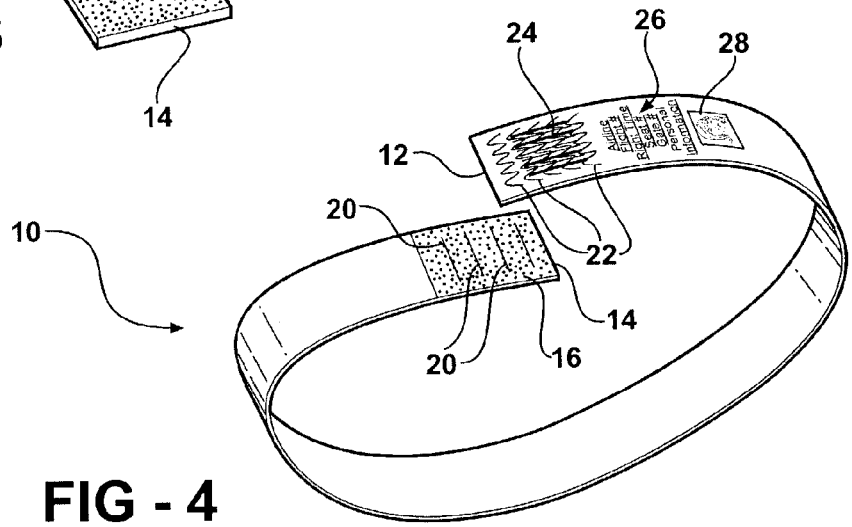
FIG. 4 is a perspective view showing the ends being positioned for attachment.

Referring to the Figures, wherein like numerals indicate like or corresponding parts throughout the several views, an airline wristband-ticket is generally shown at 10. The airline wristband-ticket comprises a strip 10 having first 12 and second 14 ends and including an attachment associated with said ends for securely attaching the ends together and rendering the ends non-retachable in response to being detached. More specifically, the attachment is typically associated with the first and second ends 12, 14 of the strip 10, and are for securely attaching the first and second ends 12, 14 together (see FIG. 5) so that if they are detached they are not effectively reattachable, and the detachment is clearly visible to the naked human eye. The attachment preferably comprises an aggressive permanent pressure sensitive adhesive 16 (see FIGS. 2–4) on the exterior face of the second end 14 of the strip 10 and initially covered by a release sheet 18. A plurality of security slits or lines of weakness 20 are formed in the strip 10 through the strip 10 at the second end 14 thereof where the strip 10 is covered by the adhesive 16. Additional slits 22 could be provided at the first end 12 where engaged by the adhesive 16. The adhesive 16 and release sheet 18, which may be transparent, may be provided by a piece of transfer tape, such as "Extra Tack" transfer tape, available from Moore Business Forms of Lake Forest, Ill. The lines of weakness 20, 22 extend in the width dimension of the strip 10 and are provided in number and extent, taking into account the aggressiveness of the adhesive 16, its adherence to the strip, so that if detachment of the ends 12, 14 is attempted once they have been adhesively secured together (as seen in FIG. 5), the strip 10 will rupture at the slits 20, 22, making effective reattachment of the band 10 ends 12, 14 with the band 10 around the wrist (as seen in FIG. 5) impossible. That is the rupture (detachment) will be clearly visible to the naked human eye. The security slits 20 and 22 can be formed either vertically or diagonally to define areas of weakness so that the wristband-ticket 10 tears in such area should attempts be made to forcefully separate the wristband 10 when adhered to itself, such as when secured to a wrist as shown in FIG. 5. The purposeful removal of the wristband 10 is accomplished by forcefully pulling on the wristband until it tears along the security slits 20, 22. Thus, a wristband 10 that either has the peel strip 18 removed, or is torn along the security slits 20, 22 is automatically invalidated and cannot thereafter be used. Attempted reuse of a wristband-ticket 10 torn along the security slits 20, 22 is visually perceptible and easily detected. This prevents persons from forcefully removing wristbands from other persons and using the same in an unauthorized manner. Should a wristband 10 become inadvertently torn along the security slits 20, 22, it can be replaced on the showing of proper identification of the person.

The wristband-ticket 10 includes a bar code 24 thereon identifying the passenger and flight information. The flight information includes the flight number and time of departure, gate number, and seat number and is also printed on the ticket 10 in alphabetic form as shown at 26. The bar code 24 is disposed over the security slits 20 or 22 so that the bar code is not readable in the event the wristband 10 is ruptured along the security slits 20 or 22. As shown in FIG. 7, an electrical circuit 30 may be substituted for the bar code. For example, the circuit 30 may be a passive circuit that is energized and read by radio frequency signals instead of a bar code reader.

In addition, the wristband-ticket 10 includes a picture 28 of the identified passenger thereon for positive identification of the passenger anywhere in the terminal or on the aircraft.

Accordingly, the subject invention provides an improved method of processing an airline passenger through a terminal. The method can be initiated by the step of reserving a seat on a flight in the name of a passenger. The passenger calling or emailing the airline or travel agent to purchase and/or reserve the ticket can accomplish this. This may be followed by the airline or travel agent issuing an eticket in the name of the passenger, by mail, fax or over the internet.

The passenger may or may not possess an eticket when checking into the terminal, but in any case the identity of the passenger is positively verified by checking a physical characteristic unique to the passenger, e.g., a picture ID such as a passport or driver's license, fingerprint, etc. This may be done by machine or by an agent, but in any case the ID must be positive. Once the positive ID is made, a picture of the identified passenger is taken and recorded in a machine, a machine that issues the wristband-ticket 10 having first 12 and second 14 ends and including an attachment 16, 20 and 22 associated with the ends 12 and 14 for securely attaching the ends together and rendering the ends non-retachable in response to being detached, in response to the strip 10 being severed at the slits 20 or 22.

The method proceeds by the machine issuing the wristband-ticket 10 with a bar code 24 thereon identifying the passenger and flight information. In addition, the ticket 10 is issued with a picture 28 of the identified passenger thereon as well as with the terminal gate and the flight number and seat assignment thereon in alphabetic form 26. The wristband-ticket 10 is printed at the check-in counter by a machine that takes the picture 28 and prints the strip 10.

The wristband-ticket 10 is placed around the wrist of the identified passenger as shown in FIG. 5. The agent removes the cover sheet 18 and secures the ends 12 and 14 of the strip together with the bar code 24 and picture 28 exposed. Thereafter the passenger is passed through checkpoints at various locations in the terminal and onto the aircraft by reading the bar code and/or viewing the photograph.

Obviously, many modifications and variations of the present invention are possible in light of the above teachings. The invention may be practiced otherwise than as specifically described within the scope of the appended claims. In addition, the reference numerals in the claims are merely for convenience and are not to be read in any way as limiting.

What is claimed is:

1. A method of processing an airline passenger through a terminal comprising the steps of:

verifying the identity of the passenger, issuing a wristband-ticket with a code thereon identifying the passenger and flight information and having first and second ends and including an attachment associated with said ends for securely attaching said ends together and rendering the ends non-reattachable in response to being detached and the code non readable, and placing a wrist band around the mist of the identified passenger, and passing the passenger through check points by reading the code.

2. A method as set forth in claim 1 including taking a picture of the identified passenger, and issuing the wristband-ticket with a picture of the identified passenger thereon.

3. A method as set forth in claim 1 including issuing the wristband-ticket with the terminal gate and the flight number and seat assignment thereon.

4. A method as set forth in claim 1 including issuing the wristband-ticket with the code thereon being a bar code identifying the passenger and flight information.

5. A method of processing an airline passenger through a terminal comprising the steps of:

reserving a seat on a flight in the name of a passenger, issuing an eticket in the name of the passenger, verifying the identity of the passenger by checking physical characteristic, unique to the passenger, taking a picture of the identified passenger, issuing a wristband-ticket with a picture of the identified passenger thereon, issuing the wristband-ticket with the terminal gate and the flight number and seat assignment thereon issuing the wristband-ticket with a bar code thereon identifying the passenger and flight information, issuing the wristband-ticket having first and second ends and including an attachment associated with said ends for securely attaching said ends together and rendering the ends non-reattachable and the code non-readable in response to being detached, placing the wristband-ticket around the wrist of the identified passenger, and passing the passenger through check points by at least one of reading the bar code and viewing the photograph.

* * * * *

UNITED STATES PATENT AND TRADEMARK OFFICE
CERTIFICATE OF CORRECTION

| | | |
|---|---|---|
| PATENT NO. | : 7,152,790 B2 | Page 1 of 1 |
| APPLICATION NO. | : 10/437758 | |
| DATED | : December 26, 2006 | |
| INVENTOR(S) | : Diane Jackson | |

It is certified that error appears in the above-identified patent and that said Letters Patent is hereby corrected as shown below:

Column 4, line 30: "by checking physical characteristic, unique to the passenger" should be --by checking physical characteristic unique to the passenger--.

Column 4, line 35: "seat assignment thereon" should be --seat assignment thereon,--.

Signed and Sealed this

Thirteenth Day of March, 2007

JON W. DUDAS
*Director of the United States Patent and Trademark Office*